Aug. 9, 1960
G. B. MILLER
2,948,113
INTERNAL COMBUSTION JET PROPULSION ENGINE
HAVING A REFLECTED PRESSURE WAVE
ENGINE CONTROL DEVICE
Filed Feb. 7, 1955
4 Sheets-Sheet 1
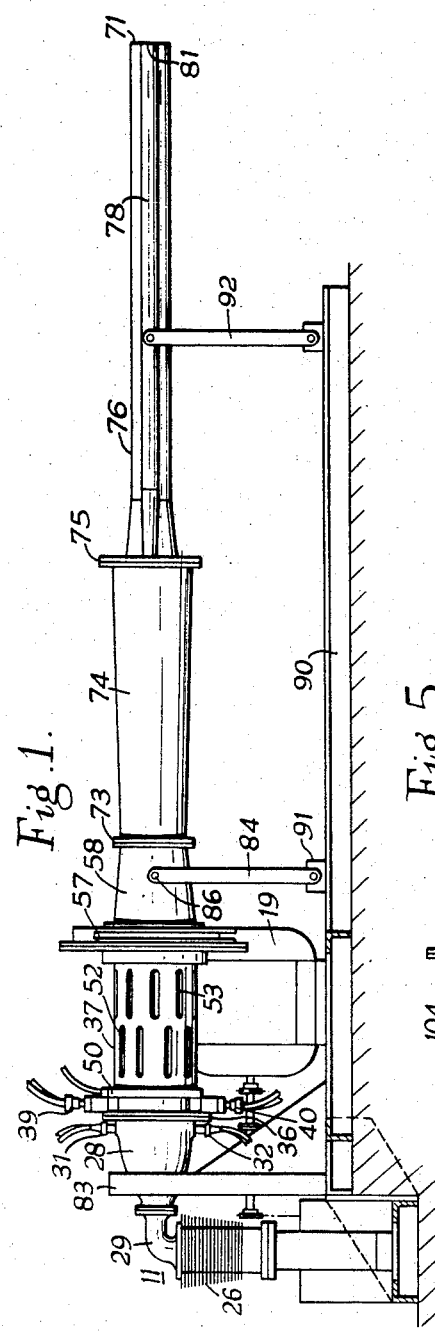
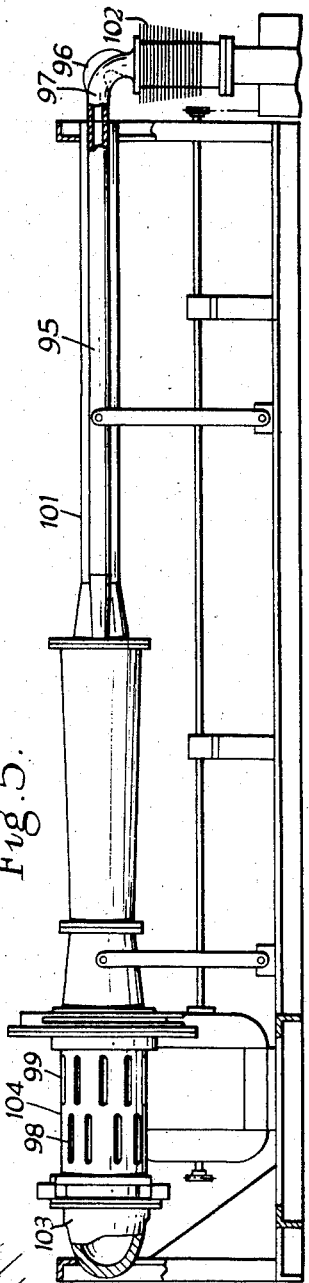
INVENTOR
George Butt Miller
BY
Klein + Hart
ATTORNEYS Aug. 9, 1960

G. B. MILLER 2,948,113

INTERNAL COMBUSTION JET PROPULSION ENGINE
HAVING A REFLECTED PRESSURE WAVE
ENGINE CONTROL DEVICE

Filed Feb. 7, 1955

INVENTOR
GEORGE BUTT MILLER
BY
Klein & Hart
ATTORNEY

United States Patent Office 2,948,113
Patented Aug. 9, 1960

2,948,113

INTERNAL COMBUSTION JET PROPULSION ENGINE HAVING A REFLECTED PRESSURE WAVE ENGINE CONTROL DEVICE

George Butt Miller, Harleypark House, Callan, County Kilkenny, Ireland; Lettice Mary Miller, executrix of said George Butt Miller, deceased Filed Feb. 7, 1955, Ser. No. 486,508

Claims priority, application Great Britain Feb. 9, 1954

5 Claims. (Cl. 60—35.6)

The present invention relates to pistonless jet propulsion engines of the kind in which a fuel mixture is adapted to be burnt in a combustion chamber in a series of intermittent explosions and in which part of the products of combustion from each explosion is trapped within a closed-ended duct connected with the combustion chamber and is thereafter utilized to raise the pressure of the next charge to be burnt in said combustion chamber, while the remainder of the products of combustion is discharged to the atmosphere through a jet nozzle.

The object of the present invention is to provide a simple and reliable engine of the kind referred to incorporating automatic means for controlling the timing of air and fuel supply to the combustion chamber and of the ignition of the air and fuel mixture.

A further object of the invention is to provide an improved inlet valve system for such an engine.

Two different embodiments of the invention will now be described by way of example with reference to the accompanying drawings in which:

Fig. 1 is a side elevation of a jet propulsion engine embodying the invention,

Fig. 5 is a side elevation of an alternative form of jet propulsion engine embodying the invention.

Figure 2:
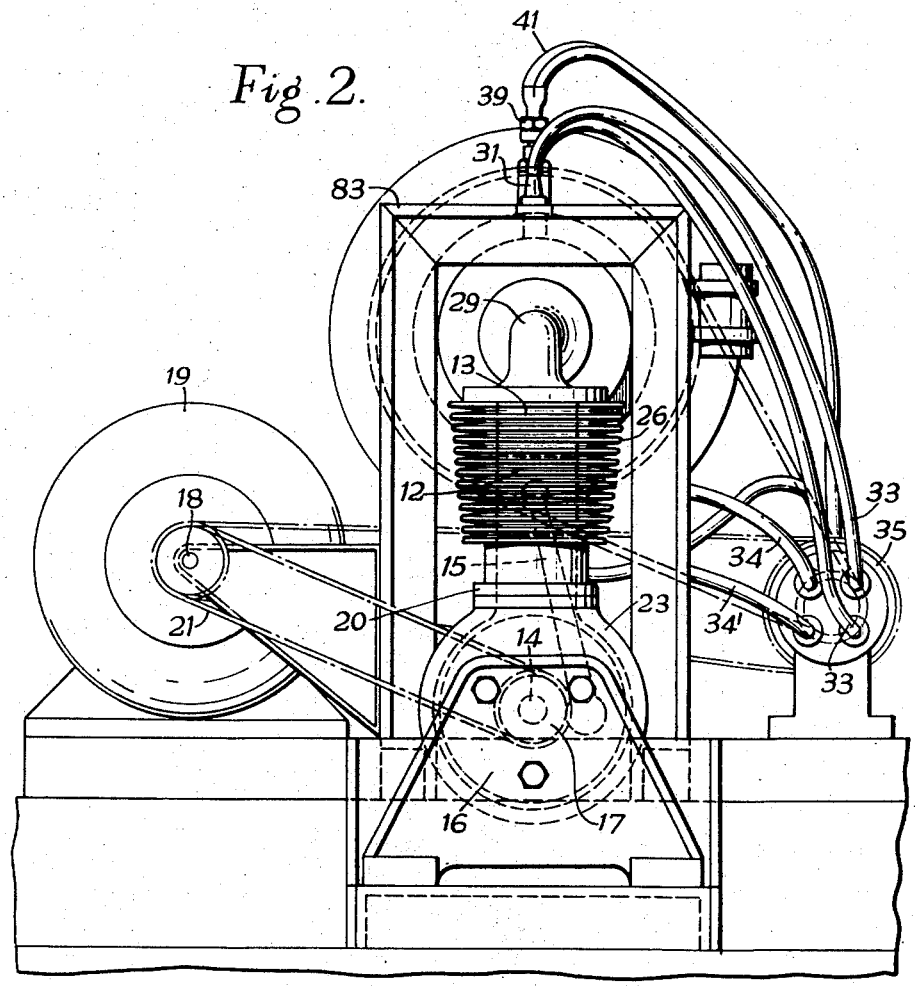
Fig. 2 is a front elevation of the engine shown in Fig. 1.
Figure 3:
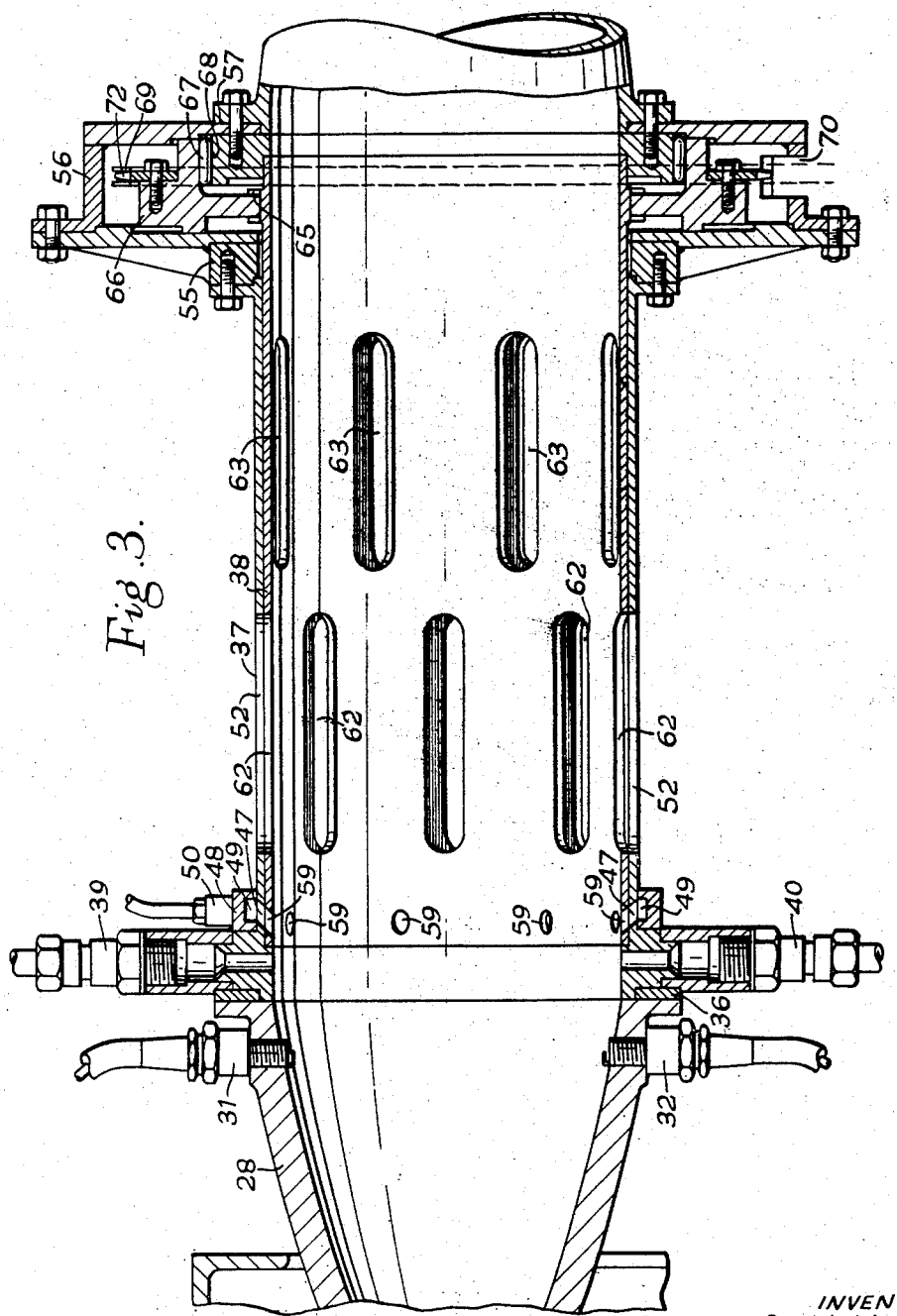
Fig. 3 is a longitudinal section of the cylinder head and cylinder body.
Figure 4:
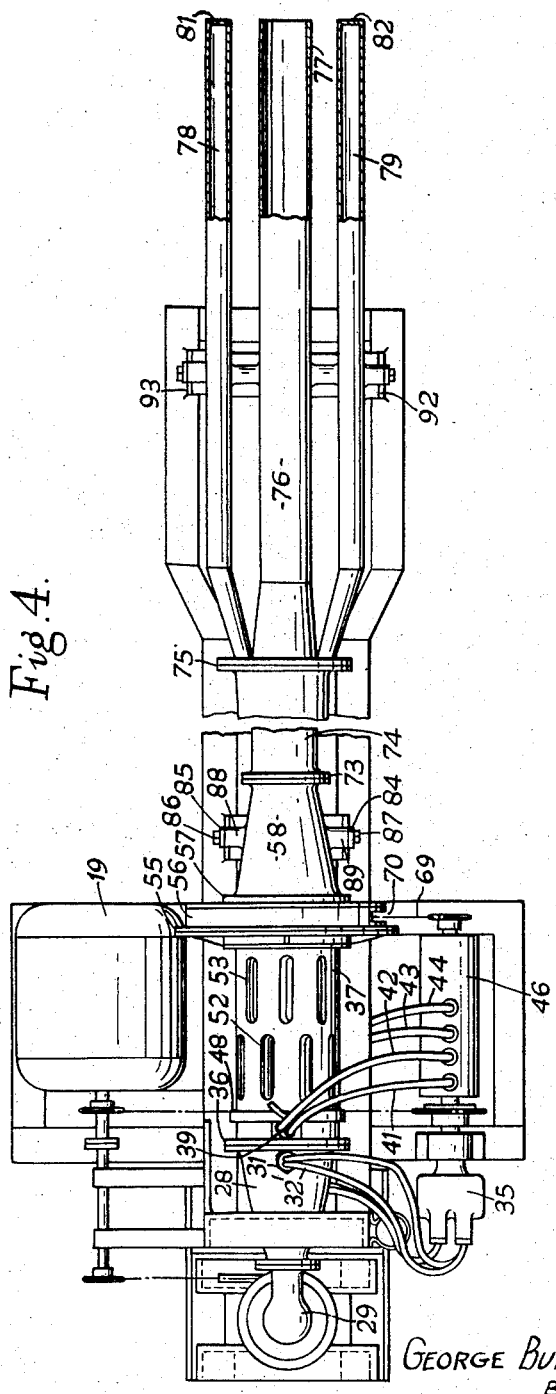
Fig. 4 is a plan view of the engine shown in Fig. 1.

Referring to the drawings and more particularly to Fig. 1, reference numeral 11 generally indicates a piston motor arranged at one end of the engine, which will be considered as the front end of the engine. The piston motor 11 which controls the sequence of operations of the engine and, more particularly, the timing of the instants of fuel injection and fuel ignition, comprises a piston 12 (Fig. 2) working in a cylinder 13. The piston 12 is coupled by a connecting rod 15 to a crankshaft 14 carrying a flywheel 16. On crankshaft 14 is mounted a pulley 17 which drives a shaft 18 of a D.C motor 19 by means of a transmission belt 21. The flywheel 16 is housed in a crankcase 23 secured rigidly to the cylinder 13 by a flanged and bolted connection 20. Air cooling fins 26 are provided externally on cylinder 13.

The cylinder head of the piston motor 11 is connected by a pipe 29 to the front of a hollow ogival cylinder head 28 (Fig. 1) the interior surface of which has the shape of a paraboloid of rotation. The cylinder head 28 is provided close to its rear end with two spark plugs 31 and 32 having paired leads 33, 33′ and 34, 34′ respectively which are connected to a distributor 35.

Secured by a flanged and bolted connection 36 to the rear end of cylinder head 28 is the front end of a cylinder body 37 which is bored out internally to receive a rotary sleeve 38. The front end of the cylinder body 37 is provided with two fuel injection nozzles 39 and 40 which are connected respectively by paired fuel pipes 42, 43, 44, 45 to a 4-cycle fuel pump 46. In the cylinder 37 a short distance behind the fuel injection nozzles 39 and 40 eight ports 47 are formed with their central axes inclined towards the inside of the cylinder head 28. A ring 48 having a rectangular groove 49 formed within it, surrounds the cylinder body 37 and covers the ports 47.

An air inlet nozzle 50, which is connected to an air compressor (not shown), is mounted in a screw-threaded bore in the outer wall of the ring 48. Two further sets of ports, each consisting of eight comparatively large ports 52 and 53, angularly offset with respect to each other, are also formed in the cylinder body 37. The rear end of the cylinder body 37 is secured by a flanged and bolted joint 55 to sprocket housing 56 which is in turn secured by a similar joint 57 to the front end of an inwardly and rearwardly tapering tube 58. The rotary sleeve 38 is formed with eight ports 59 corresponding to ports 47 in the cylinder 37 and two sets of comparatively large ports 62 and 63 corresponding to large ports 52 and 53 respectively in cylinder 37. The central axes of ports 59 are inclined in the same direction as the axes of the ports 47. The rear end of the sleeve 38 extends beyond the rear end of the cylinder body 37 and its rearwardly projecting end has splined on it a circular flange 65. The radially outer part of the flange 65 is bolted to a sprocket carrier ring 66 which is mounted on a roller bearing comprising rollers 67 supported on a race 68 formed on the inside of the rear wall of the sprocket housing 56. Two apertures 70 are formed in the wall of the sprocket housing 56, through which a driving chain 69, engaging the teeth of a sprocket 72, which is bolted to the sprocket carrier ring 66, passes into and out of the housing 56.

The rear end of the tapered tube 58 is attached by a flanged and bolted joint 73 to the front end of a connecting pipe 74 the cross-section of which progressively changes from a circular shape at this front end to an elliptical shape at its rear end the major axis of the ellipse being horizontal. The tapered tube 58 and the connecting pipe 74, as a whole, constitute an elongated resonance tube. At its rear end, the connecting pipe 74 is coupled by a further flanged and bolted joint 75 to an assembly comprising a central jet tube 76 which is open at its rear end 77 and two branch ducts 78 and 79 which are closed at their rear ends 81 and 82. The branch ducts 78 and 79 first extend outwardly and rearwardly from opposite sides of the central jet tube 76 near the front end of the latter and then continue rearwardly and parallel thereto.

The cylinder head is fixedly supported by a frame unit 83, a pair of links 84 and 85 support the tapering tube 58 by means of pins 86 and 87 projecting laterally from bosses 88 and 89 on the sides of the tube 58 and passing through holes near the tops of the links. The links 84 and 85 are connected by similar joints to blocks 91, of which only one is shown in Fig. 1, fixed to the base 90 on which the engine is mounted. The links can pivot about the pins 86 and 87 which connect them to the bosses and blocks thus allowing for longitudinal thermal expansion of the tubes and ducts when the engine is in use. Links 92 and 93 support the jet tube 76 and the ducts 78 and 79 in the same way as the links 84 and 85 support the tube 58.

To start the engine, the compressor (not shown), which may be driven by an independent motor, is put into operation and the D.C. motor is energised in order to initiate the cycle of operations of the engine.

The cycle of operations of the engine is as follows:

The compressor pumping air into the rectangular section groove 49 maintains a high pressure in the latter. Thus, when the ports 59 of the rotary sleeve are in register with ports 47 in the cylinder 37, the compressed air is injected through the ports towards the interior of the cylinder head 28 in the form of jets. Then, in quick succession, a shot of fuel is injected through nozzle 39 or 40 into the compressed air jets and a spark is produced at spark plug 31 or 32 thus igniting the mixture and causing it to expand. The consequent sudden increase in pressure in the cylinder head 28, causes a pressure wave to travel towards the ends 81, 82 of the ducts 78, 79 and the end 77 of the jet tube 76. On arriving at the ends 77, 81, 82, part of the gas of the pressure wave escapes through the end 77 and part of the wave is reflected by the closed ends 81 and 82 of the ducts 78 and 79. While the initial and reflected pressure wave has been travelling between the tube 58 and the ends 81 and 82, air is admitted into the cylinder body 37 through the two sets of ports 62 and 63 in the sleeve and the ports 52 and 53 in the cylinder 37 which have in the meantime been brought into register. When the reflected pressure wave reaches the rear end of cylinder body 37, the ports 52, 53 are closed again and the air trapped in the cylinder body 37 is swept into the cylinder head 28 by the reflected wave and compressed there. It is at this instant in the cycle that the reflected wave exerts its control over the movement of the piston 12 working in the cylinder 13. For if the piston 12 is approaching the bottom of its stroke the pressure of the compressed air in the cylinder head 28, which is also exerted on the piston 12, will cause the piston to accelerate in its downward motion; if however the piston 12 is already at the beginning of its upward stroke its motion will be slowed down due to the increase in pressure in the cylinder head 28. Thus the motion of the piston is synchronised by the reflected pressure wave. When the piston arrives near the bottom of its stroke, compressed air is again injected through the ports 47 and 59 and the sequence of operations is repeated.

As stated the armature of the D.C. motor is only energised to start and run the engine up to speed, but once the engine is running, it acts as a flywheel to resist changes in the speed of the flywheel 16, the shaft of the distributor 35 and fuel pump 46 and the rotary sleeve 38 to which it is coupled.

The leads 33, 33' and 34, 34' are paired so that the spark plugs 31 and 32 are ignited alternatively, and the fuel pipes 41, 42 and 43, 44 are similarly paired so that the fuel is injected alternatively through the nozzles 39 and 40.

An alternative arrangement is shown in Fig. 5 where the front of the ogival cylinder is closed and the cylinder head of the piston motor is connected via pipes 96 and 97 to ducts of which one is indicated by 95 and the other is not shown.

The said ducts correspond to the ducts 78 and 79, in the previous embodiment except that in the present embodiment, the walls 81 and 82 have been removed.

In this embodiment, the cycle of operations is as follows:

Compressed air is forced through the ports which correspond to the ports 47, 59 in the previous embodiment, a shot of fuel is injected into the compressed air jets and a spark at the spark plug explodes the mixture. The ports 98 and 99 being closed, the pressure wave travels to the ducts 95 where part of it escapes through the end of the jet tube 101 and the other part impinges on the piston in the piston motor 102, thus regulating the movement of this piston, as explained with reference to Figs. 1 to 4. The said other part of the pressure wave is now reflected back from the piston to the cylinder head 103 where air has in the meantime been admitted through ports 98 and 99 due to the rotation of the rotary sleeve. This air is swept, by the reflected wave into the cylinder 103 and compressed there. Compressed air and fuel, are meanwhile injected again into the cylinder 104 through the air ports and fuel nozzle respectively and the cycle of operations is repeated.

The crankshaft of the piston motor may be coupled to an air screw, supercharger or the like, to reduce the risk of the valve-sleeve, fuel-pump and other auxiliary parts running at an uneven speed which would in turn cause uneven firing in the cylinder head.

I claim:

1. A jet engine comprising an elongated resonance tube, a combustion chamber at one end of said resonance tube, a substantially closed ended duct at the other end of said resonance tube, a cylinder body having two inlet ports located between said chamber and said duct, a sleeve rotatably mounted within said cylinder body and provided with two ports cooperating respectively with said two body ports, means for supplying compressed air through one pair of said cooperating ports to said combustion chamber, the other pair of said cooperating ports being arranged to control communication between the chamber defined by said sleeve and the atmosphere, means for introducing a combustible fuel charge into said combustion chamber and for igniting said introduced charge, means including a motor to rotate said sleeve and to operate, in synchronism with the rotation thereof, said fuel charge introducing and igniting means, and regulating means responsive to pressure waves from said resonance tube to regulate the speed of said motor and thereby to regulate the timing of the opening and closing of said ports by said sleeve and to control the timing of said fuel charge introducing and igniting means.

2. A jet engine as claimed in claim 1 wherein the said regulating means are constituted by a piston motor in communication with said combustion chamber.

3. A jet engine as claimed in claim 1 wherein the said regulating means are constituted by a piston motor having a cylinder and a piston working in said cylinder, said cylinder being in communication with said substantially closed-ended duct and the said duct being substantially closed by said piston.

4. A jet engine comprising a piston motor having a pressure chamber, a cylinder head in communication with the pressure chamber of said piston motor, ignition means including a spark plug provided in said cylinder head, a cylinder body connected to said cylinder head and formed with at least two axially spaced ports; a sleeve rotatably mounted within said cylinder body and formed with at least two further axially spaced ports cooperating with said two ports, compressed air supply means connected to one of said ports, fuel injection means including a fuel injection nozzle located between said spark plug and said port connected to said air supply means, a fuel pump arranged for the supply of fuel to said fuel injection means, a chain sprocket mounted on said sleeve, a chain drivably connected with said chain sprocket, driving means for said fuel pump, ignition means and sleeve, said driving means being drivably connected to said sleeve by means of said chain, a first tube secured to said cylinder body having a substantially circular cross-section tapering towards the end remote from said cylinder body, a second tube secured end to end with first tube having a substantially circular cross-section at the end near said first tube and its cross-section progressively becoming elliptical towards the end remote from said first tube, two ducts secured to said second tube having their ends remote from said second tube closed and a jet tube open at both ends and having one end secured to said second tube.

5. A jet engine comprising a cylinder head, ignition means including a spark plug provided in said cylinder head, a cylinder body connected to said cylinder head formed with at least two axially spaced ports, compressed air supply means connected to one of said ports, a sleeve rotatably mounted within said cylinder body and formed with at least two further axially spaced ports co-operating with said two ports, fuel injection means including a fuel injection nozzle located between said spark plug and said port connected to said air supply means, a fuel pump arranged for the supply of fuel to said fuel injection means, a chain sprocket mounted on said sleeve, a chain drivably connected with said chain sprocket, driving means for said fuel pump, ignition means and sleeve, said driving means being drivably connected to said sleeve by means of said chain, a first tube secured to said cylinder body having a substantially circular cross-section tapering towards the end remote from said cylinder body, a second tube secured end to end with first tube having a circular cross-section at the end near said first tube and its cross-section progressively becoming elliptical towards the end remote from said first tube, two ducts secured to said second tube, a piston motor including a piston working in a cylinder and whereof said cylinder is in communication with said cylinder head and consequently with the ends of said ducts remote from said second tube.

References Cited in the file of this patent

UNITED STATES PATENTS

| | | |
|---|---|---|
| 2,480,626 | Bodine | Aug. 30, 1949 |
| 2,546,965 | Bodine | Apr. 3, 1951 |
| 2,546,966 | Bodine | Apr. 3, 1951 |
| 2,580,908 | Goddard | Jan. 1, 1952 |

FOREIGN PATENTS

| | | |
|---|---|---|
| 176,838 | Great Britain | Mar. 6, 1922 |